US010444788B2

(12) United States Patent
Carlstedt et al.

(10) Patent No.: US 10,444,788 B2

(45) Date of Patent: Oct. 15, 2019

(54) DEVICE, SYSTEM, AND METHOD FOR SYNCHRONIZING TIME PARTITION WINDOWS

(71) Applicant: Wind River Systems, Inc., Alameda, CA (US)

(72) Inventors: Markus Carlstedt, Uppsala (SE); Kenneth Jonsson, Sollentuna (SE)

(73) Assignee: Wind River Systems, Inc., Alameda, CA (US)

( * ) Notice: Subject to any disclaimer, the term of this patent is extended or adjusted under 35 U.S.C. 154(b) by 224 days.

(21) Appl. No.: 15/683,493

(22) Filed: Aug. 22, 2017

(65) Prior Publication Data

US 2019/0064873 A1 Feb. 28, 2019

(51) Int. Cl.

| | |
|---|---|
| ***G06F 1/12*** | (2006.01) |
| ***G06F 13/42*** | (2006.01) |
| ***H04L 5/00*** | (2006.01) |
| ***H04L 7/00*** | (2006.01) |

(52) U.S. Cl.

CPC .............. *G06F 1/12* (2013.01); *H04L 7/0079* (2013.01)

(58) Field of Classification Search

CPC ................................. G06F 1/12; H04L 7/0079

See application file for complete search history.

(56) References Cited

U.S. PATENT DOCUMENTS

2010/0054282 A1* 3/2010 Schirmer .................. G06F 1/12 370/503

2014/0245057 A1* 8/2014 Wroblewski ........ G06F 11/1679 713/375

2016/0048156 A1* 2/2016 Detert .................... G05B 19/05 713/400

* cited by examiner

*Primary Examiner* — Xuxing Chen

(74) *Attorney, Agent, or Firm* — Fay Kaplun & Marcin, LLP

(57) ABSTRACT

A device, system, and method synchronizes time partition windows. The method performed at a first electronic device includes receiving a clock signal from a second electronic device, the clock signal indicating a modification to synchronize a first clock of the first electronic device to a second clock of the second electronic device. The method includes generating an operating system tick interrupt based on the clock signal, the operating system tick interrupt indicating a modification to synchronize a first operating system tick of the first electronic device to a second operating system tick of the second electronic device. The method includes generating a first schedule of first time partition windows based on the first operating system tick. The first schedule of the first time partition windows is synchronized to a second schedule of second time partition windows of the second electronic device.

20 Claims, 7 Drawing Sheets

Scenario 600

605A 605B 605C 605D 650E 650F 605

W1 W2 W3 W1 W2 W3

System 115 t

640 TX 650 Latency

RX 645

610

W1 W2 W3 W1 W2 W3

System 120 t 610A 610B 610C 610D 610E 610F

--PRIOR ART--

--PRIOR ART--

DEVICE, SYSTEM, AND METHOD FOR SYNCHRONIZING TIME PARTITION WINDOWS

BACKGROUND INFORMATION

An electronic device may include a processor that executes a variety of different types of computer-executable instructions from various programs, applications, modules, etc. (hereinafter collectively referred to as "applications"), to perform various functionalities. In executing these applications, the electronic device may utilize time partition windows where each window includes one or more tick interrupts, each tick being a known time duration. When performing operations within the electronic device itself, the electronic device may perform these operations in a time deterministic manner based on a schedule of the time partition windows.

In another type of operation performed by the electronic device, the electronic device may be connected to a network and exchange data with another electronic device that is also connected to the network. The time partition windows may also be used in performing a data transmission. For example, the schedule of time partition windows may define which of the time partition windows may be used in performing a data transmission (e.g., both receiving and transmitting) while other time partition windows are reserved for other operations. Accordingly, to minimize the time necessary to complete a data transmission under a scenario where an increased time is necessary (e.g., a worst-case scenario), the participating electronic devices may utilize the information of the schedule of the time partition windows (e.g., if a common schedule is used or knowledge of respective schedules). However, discrepancies in an alignment of the interrupts lead to discrepancies in the time partition windows which may result in scenarios where additional latency (e.g., more time) is created to perform the data transmission.

SUMMARY

The exemplary embodiments are directed to a method, comprising: at a first electronic device: receiving a clock signal from a second electronic device, the clock signal indicating a first modification to a first clock tick of a first clock of the first electronic device to synchronize the first clock to a second clock of the second electronic device, the clock tick defining a clock time period that tracks a first passage of time on the first clock; generating an operating system tick interrupt based on the clock signal, the operating system tick interrupt indicating a second modification to a first operating system tick of a first processor of the first electronic device to synchronize the first operating system tick of the first electronic device to a second operating system tick of the second electronic device, the first operating system tick defining an operating system time period that tracks a second passage of time on the processor; and generating a first schedule of first time partition windows based on the first operating system tick, the first time partition windows respectively defining select operations allowed to be performed therein, wherein the first schedule of the first time partition windows is synchronized to a second schedule of second time partition windows of the second electronic device.

The exemplary embodiments are directed to an electronic device, comprising: a transceiver configured to receive a clock signal from a second electronic device, the clock signal indicating a first modification to a first clock tick of a first clock of the electronic device to synchronize the first clock to a second clock of the second electronic device, the first clock tick defining a clock time period that tracks a first passage of time on the first clock; and a processor generating an operating system tick interrupt based on the clock signal, the operating system tick interrupt indicating a second modification to a first operating system tick of a first processor of the electronic device to synchronize the first operating system tick of the electronic device to a second operating system tick of the second electronic device, the first operating system tick defining an operating system time period that tracks a second passage of time on the processor, the processor including a time partition scheduler generating a first schedule of first time partition windows based on the first operating system tick, the first time partition windows respectively defining select operations allowed to be performed therein, wherein the first schedule of the first time partition windows is synchronized to a second schedule of second time partition windows of the second electronic device.

The exemplary embodiments are directed to a system, comprising: a first electronic device receiving a clock signal that indicates a first modification to a first clock tick of a first clock of the first electronic device, the first clock tick defining a clock time period that tracks a first passage of time on the first clock; and a second electronic device receiving the clock signal that indicates a second modification to a second clock tick of a second clock of the second electronic device, the second clock tick defining the clock time period that tracks a second passage of time on the second clock, wherein the first and second electronic devices generate first and second operating system tick interrupts, respectively, based on the clock signal, the first and second operating system tick interrupts indicating a third modification and a fourth modification, respectively, to a first operating system tick of a first processor of the first electronic device and a second operating system tick of a second processor of the second electronic device, respectively, wherein the first and second operating system tick interrupts synchronize the first operating system tick of the first electronic device to the second operating system tick of the second electronic device, the first and second operating system ticks each defining an operating system time period that tracks a second passage and a third passage of time on the first and second processors, respectively, wherein the first and second processors each generate a first schedule of first time partition windows based on the first operating system tick and a second schedule of second time partition windows based on the second operating system tick, the first schedule of the first time partition windows being synchronized to the second schedule of the second time partition windows.

DETAILED DESCRIPTION

Figure 1:
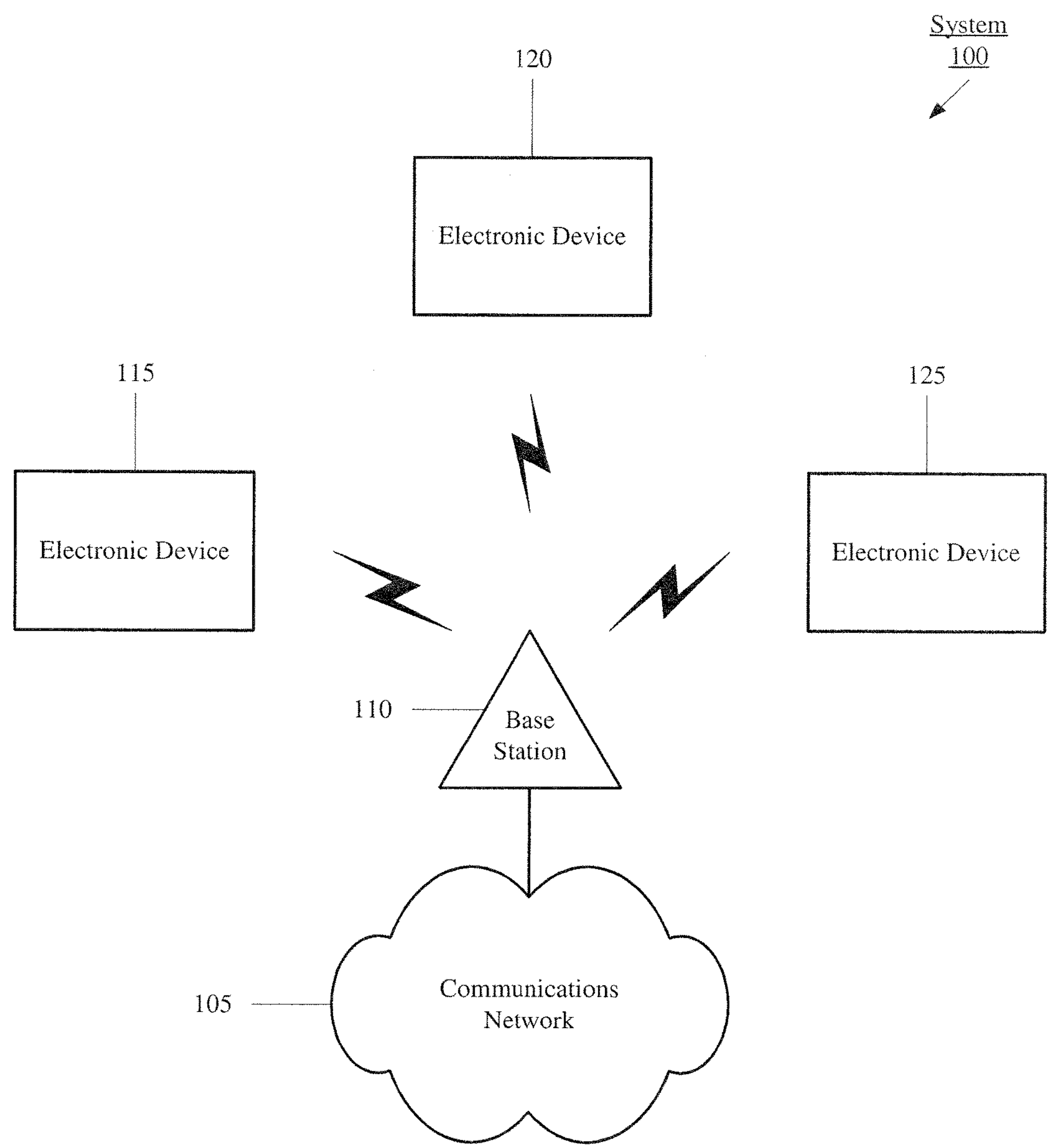
FIG. 1 shows a system of electronic devices according to the exemplary embodiments.

The exemplary embodiments may be further understood with reference to the following description and the related appended drawings, wherein like elements are provided with the same reference numerals. The exemplary embodiments are related to a device, a system, and a method for optimizing a manner in which time partition windows of operating systems among a plurality of electronic devices are used. Specifically, the exemplary embodiments relate to a mechanism utilizing an operating system tick interrupt that synchronizes an operating system tick to further synchronize the time partition windows. The operating system tick interrupt may be based on a clock tick interrupt from a network clock synchronization operation.

When scheduling operations based on time, the electronic device may utilize time partition scheduling. Time partition scheduling enables real time processes (RTPs) to be scheduled to guarantee that the RTPs have access to a processor or one or more other components during a specified time frame. A time partition schedule may include a sequence of time partition windows (TPWs) that the RTPs may be assigned. The time partition schedule may repeat as needed and one or more different schedules may be used or switched at runtime. When the operations are entirely performed within the system of the electronic device, the timing of performing the operations may be deterministic as the time partition scheduling is based within only a single schedule and the scheduling is based on the clock of the electronic device. In safety critical software environments in which the electronic device is involved, the operating system of the electronic device may also schedule operations using the time partition scheduling. Specifically, a time partition scheduler (TPS) of the time partition scheduling may achieve separation of the operations in both time and space (e.g., when combined with software support for a memory management unit (MMU) of the electronic device). This separation may be instrumental for safety critical operating systems.

Although the use of the TPS may be relatively simple when only considering a single electronic device and performing operations wholly within this single electronic device, deploying a network application in an electronic device using the TPS may be challenging. Particularly, if determinism over the communications network is to also be achieved when performing the network application, the deployment of the network application in the electronic device using the TPS may be significantly more challenging. For example, if determinism is to be achieved over time, a synchronization must be achieved between two or more schedules and TPSs. Specifically, the TPWs created by the TPSs must be synchronized such that timing information of the corresponding electronic devices is known. It is noted that a determinism over time may refer specifically to a clock skew under a poor or worst-case scenario.

As those skilled in the art will understand, the TPW may be a duration of time in which operations may be performed. Initially, it is noted that the TPS, the TPW, and components/features thereof are related to an operating system of the electronic device. As an operating system related operation, the TPS may generate a set of TPWs that is repeated over time. Thus, the schedule may include a first TPW lasting a first duration, a second TPW lasting a second duration, and a third TPW lasting a third duration, etc., the ordered TPWs being repeated until the TPS is no longer required. The duration of each TPW may be defined by a tick. As those skilled in the art will understand, a tick may define a cycle or constant time duration of a basic operational process of an electronic device. Accordingly, an operating system tick may track how the TPWs continuously proceed over time. In an exemplary implementation, the operating system may utilize 1,000 ticks per second.

To improve performing network applications in which transmissions are exchanged over the network, particularly with regard to improving a timing associated with performing these transmissions, the electronic devices connected to the network may synchronize respective clocks to a common clock. Accordingly, operations may at least be performed based on a timing according to a clock (e.g., a transmission is going to be sent at a time of the clock). One manner of synchronizing clocks is with a time sensitive network (TSN). The TSN may define standards used for transmissions performed over a network. In a specific example, the standards of the TSN may be for IEEE 802.1. However, it is noted that the TSN being implemented for networks under IEEE is only exemplary and the TSN may represent standards that are used to synchronize clocks for any type of network. The standards may be intended to perform a transmission with very low transmission latency and high availability as is applied to real time operations (e.g., audio and/or video streaming).

The standards may be defined into three basic categories required for real-time or time sensitive communications/transmissions. Each standard may be used independently as each standard is sufficient on its own. However, when the three categories of standards are used in a concerted manner, the TSN may achieve an improved performance and efficiency. The three standards involve time synchronization, scheduling and traffic shaping, and selection of communication paths, path reservations, and fault-tolerance. Time synchronization may entail the electronic devices participating in a real-time communication to utilize a common understanding of time (i.e., a synchronization of clocks to a common, master clock). Scheduling and traffic shaping may entail the electronic devices participating in the real-time communication to utilize a common set of rules to process and forward communication packets. Selection of communication paths, path reservations, and fault-tolerance may entail the electronic devices participating in the real-time communication to utilize a common set of rules to select communication paths and reserve bandwidth and time slots.

In synchronizing the clocks of the electronic devices, a clock signal may be transmitted to the electronic devices. The clock signal may indicate a time of a master clock such that the electronic devices that receive the clock signal may utilize an appropriate clock tick interrupt to synchronize a local clock to the master clock. With regard to clocks, there may be a different tick that is used from the operating system tick. Specifically, a clock tick may run to track a timing of the clock. Based on tracking components such as an oscillator of the clock, the clock ticks may be tracked and the clock may be kept in time. A tick interrupt may be a signal transmitted to a processor of an electronic device that is used for a tick. Accordingly, the clock tick interrupt may be a signal from the clock to indicate to the processor the passage of time corresponding to a clock tick. The clock tick interrupts may continuously be provided from the clock to the processor to indicate each passage of time corresponding to a duration of time defined by the clock tick. Specifically, the clock signals may be received in generating these clock tick interrupts.

Under a TSN, the clock tick interrupt may be a product of a precision time protocol (PTP) that is used to synchronize the clocks of the electronic devices such that the same time is maintained across the electronic devices. When used properly, the PTP may achieve clock accuracy across the clocks of the electronic devices connected to the network in the sub-microsecond range. As those skilled in the art will understand, PTP provides a much improved manner of clock synchronization above other contemporary procedures such as network time protocol (NTP) (since PTP provides accuracies beyond NTP) and global positioning system (GPS) (since GPS has a high cost and, depending on position, GPS signals may be unavailable).

The PTP defines a hierarchical master-slave architecture to synchronize the clocks of the electronic devices. Using this architecture, the distribution of the clock signal includes at least one electronic device and at least one clock thereof that is to be synchronized. There are various types of clocks that may be used in the distribution of the clock signal. In a first example, an ordinary clock that is synchronized from one of the electronic devices connected to the network utilizes a single network connection and is one of a source/master or a destination/slave. In a second example, a boundary clock utilizes a plurality of network connections and is configured to accurately synchronize the clocks of the electronic devices.

As the architecture states, the participants may include at least one master and at least one slave. A master may be selected from any of the electronic devices involved in the clock synchronization. It is noted that, in this context, the electronic devices may include edge devices or network components (e.g., servers). Thus, the master may be responsible for propagating the clock signal based on the master clock to slave electronic devices to which the corresponding slave clocks are to be synchronized. It is noted that the master may be a slave to a grandmaster which provides a root timing reference. Accordingly, the grandmaster may transmit synchronization information (e.g., clock signal) to the master electronic devices for the master (boundary) clocks to be synchronized and subsequently the master electronic devices may transmit synchronization information to the slave electronic devices for the slave clocks to be synchronized. It is noted that in simplified PTP systems, there may be no masters and only a grandmaster which is elected and all other clocks are synchronized directly thereto. In this manner, the PTP may be used to synchronize all clocks of electronic devices that are connected to the network.

Although clocks of electronic devices connected over a network may be synchronized using the PTP of the TSN, there is still no guarantee that network applications are performing operations related to transmissions over the network with synchronized operating systems. That is, the transmissions may still not be performed in a deterministic manner as the clock and clock ticks are separate from the operating system and operating system ticks. For example, in view of the TSN having categories of standards including sets of rules that are to be followed, a similar set of standards may also be used for the operating system such that there may be first TPWs that are reserved or used for transmissions over the network while second TPWs are used for non-transmission operations. Therefore, a transmission from a first electronic device may be required to be performed during the first TPW and a reception by a second electronic device may also be required to be performed during the first TPW (assuming a common use of a single schedule of TPWs). Accordingly, even with synchronized clocks where clock ticks may be synchronized with one another, operating system ticks of the electronic devices may remain unsynchronized to one another as the operating system ticks are independent of clock ticks. That is, the schedules of the TPWs for the operating systems of the electronic devices may not be synchronized.

Even assuming an original synchronization had existed between the TPWs of the electronic devices of the network, the TPWs eventually drift apart over the course of time due to various factors (e.g., oscillators maintaining a different corresponding operating system tick in tracking the schedule of the TPWs). With TPWs of operating systems that are not synchronized (although clocks may be synchronized), a transmission sent from one electronic device to another may be delayed because the receiving electronic device may not be in the correct TPW used for the receiving process when the transmission is incoming. Because of the TPW drift, the amount of time to perform the transmission may increase (e.g., increase latency). Furthermore, the latency may be different from one transmission to another transmission, ultimately causing jitter.

In view of the drift in schedules of TPWs, the exemplary embodiments are configured to reduce latency and jitter by synchronizing the operating ticks of operating systems of electronic devices and consequently the TPWs in performing network applications including transmissions over a network. As will be described in further detail below, the electronic devices connected to the network having synchronized clocks using the PTP may also synchronize the TPWs by generating a clock tick interrupt based on a clock signal of the PTP to be applied to the operating system tick. Specifically, an operating system tick interrupt may be created from converting the clock tick interrupt. The operating system tick may be synchronized to result in the TPWs of different electronic devices to become synchronized. Accordingly, the operating system tick interrupt of the operating system of the electronic device may be driven by the PTP of a network interface card (NIC) to create a TPS with synchronized TPWs where even commonly available off-the-shelf PTP capable NICs may generate programmable operating system tick interrupts based on the PTP clock (e.g., via the clock tick interrupt). Thus, the exemplary embodiments create synchronized TPWs across a plurality of electronic devices to provide a deterministic approach for performing the network applications.

FIG. 1 shows a system 100 of electronic devices 115, 120, 125 according to the exemplary embodiments. The system 100 shows a communication network 105 in which a data transmission may be performed between two or more of the electronic devices 115, 120, 125. The electronic devices 115, 120, 125 may be connected to the communications network 105 via a base station 110. Accordingly, the electronic device 115, 120, 125 may utilize any association operation or handshake to connect to the base station 110 and the communications network 105. It is noted that the use of the base station 110 is only exemplary and the base station 110 may represent any network component such as a server, a switch, a router, a gateway, etc.

Initially, the communications network 105 may represent any network in which one or more of the electronic devices 115, 120, 125 connect (via a base station) for operations to be performed over the communications network 105 such as data transmissions. For example, the communications network 105 may be a wireless network in which one or more of the electronic devices 115, 120, 125 connect using a wireless connection to the base station 110, a wired network in which one or more of the electronic devices 115, 120, 125 connecting using a wired connection to the base station 110, a combination thereof, etc. The communications network 105 may also represent any type of network such as a cellular network (e.g., 3G, 4G, LTE, etc.), a WiFi network, a HotSpot, a local area network (LAN), a wide area network (WAN), etc. Depending on the type of network and the communications that the communications network 105 are configured to support, the base station 110 may be a corresponding network component that enables the electronic devices 115, 120, 125 to connect to the communications network 105.

It is noted that the communications network 105 is illustrated with one base station 110. However, this network architecture is only exemplary. For example, when the communications network 105 is a private, home WiFi network, there may be only one base station 110. However, in another example, when the communications network 105 is a cellular network (e.g., LTE network), there may be a plurality of base stations (e.g., evolved Node Bs (eNBs)) geographically distributed in an intended operating area of the cellular network.

According to the exemplary embodiments, the communications network 105 may also be a TSN configured with a PTP. As a PTP enabled network, the communications network 105 may allow the electronic devices 115, 120, 125 to synchronize clocks to one another. As described above, the communications network 105 may enable one of the electronic devices 115, 120, 125, the base station 110, or another electronic device to provide a master clock so that the clocks of the electronic devices 115, 120, 125 may maintain a common time based on this master clock. Specifically, a clock signal associated with the master clock may be distributed to the one or more slave clocks. The communications network 105 may utilize any mechanism to synchronize the clocks of the electronic devices 115, 120, 125. However, for illustrative purposes, the representative mechanism utilized herein by the PTP to synchronize the clocks of the electronic devices 115, 120, 125 is through the clock signal that is used to generate the corresponding clock tick interrupt in each of the electronic devices 115, 120, 125. Also for illustrative purposes, the master clock may be based on the clock of the base station 110. It is again noted that the base station 110 is only exemplary and may also be a server, a switch, a router, a gateway, etc.

The electronic devices 115, 120, 125 may represent any set of devices that may communicate with one another via the communications network 105 so that transmissions may be exchanged between two or more of the electronic devices. Initially, it is noted that the system 100 including three electronic devices 115, 120, 125 is only exemplary. Those skilled in the art will understand that the system 100 may include any number of electronic devices. However, since the exemplary embodiments are directed to synchronizing TPWs of different electronic devices, the system 100 may include at least two electronic devices.

Figure 2:
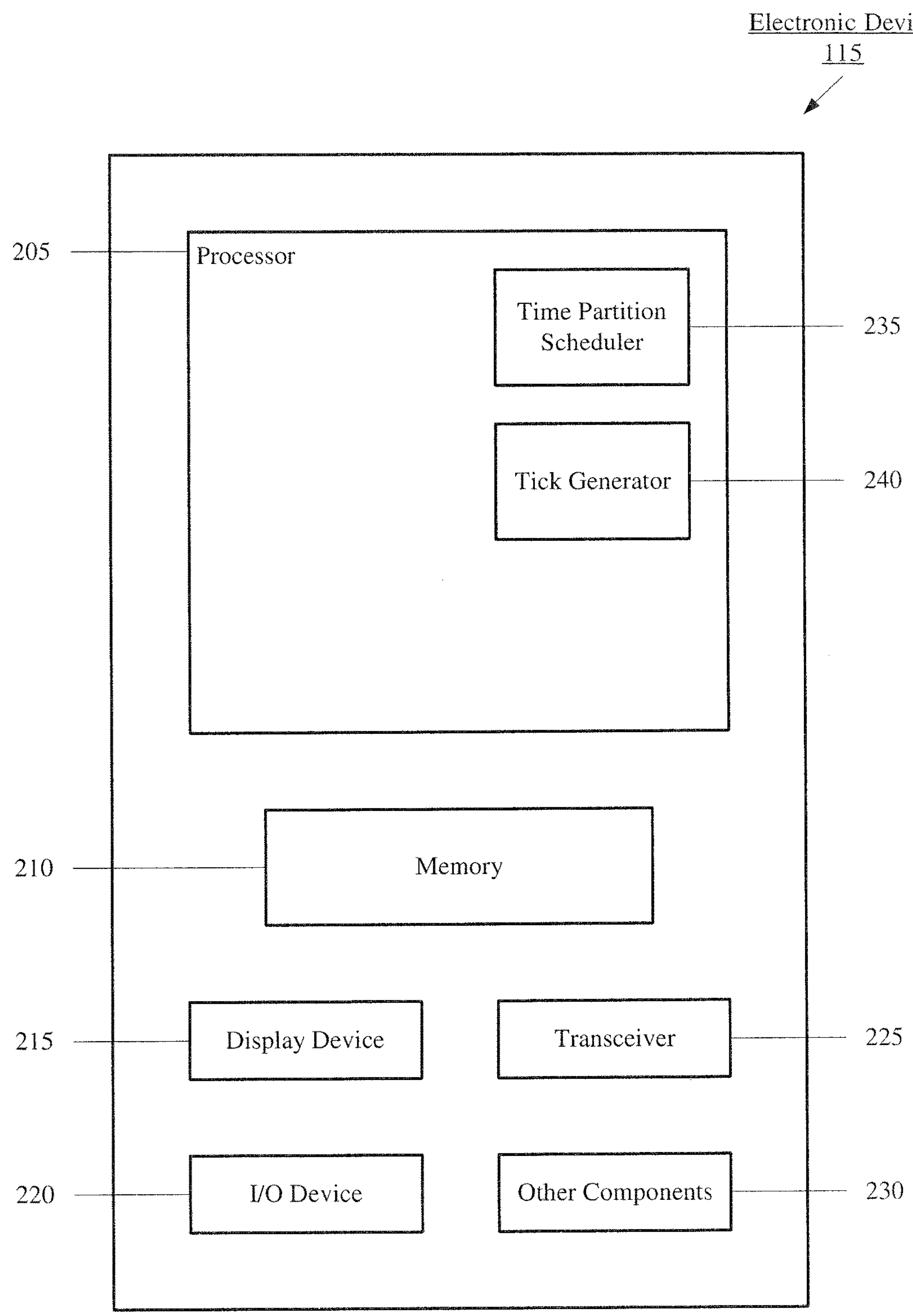
FIG. 2 shows an electronic device of the system of FIG. 1 according to the exemplary embodiments.

FIG. 2 shows the electronic device 115 of the system 100 of FIG. 1 according to the exemplary embodiments. The electronic device 115 may be configured to execute applications and perform operations thereof using computer-executable instructions. The electronic device 115 may also be configured to generate an operating system tick interrupt based on the clock tick interrupt which is generated using a received clock signal to synchronize TPWs with other TPWs according to the exemplary embodiments in performing the operations. The electronic device 115 may represent any electronic device such as, for example, a portable device (e.g., a cellular phone, a smartphone, a tablet, a phablet, a laptop, a wearable, etc.) or a stationary device (e.g., desktop computer). The electronic device 115 may include a processor 205, a memory 210, and a transceiver 225. The electronic device 115 may further optionally include one or more of the following: a display device 215, an input/output (I/O) device 220, and other suitable components 230, such as, for example, a portable power supply, an audio I/O device, a data acquisition device, ports to electrically connect the electronic device 115 to other electronic devices, etc. It is noted that the description herein for the electronic device 115 may also be applicable to the other electronic devices 120, 125.

The processor 205 may be configured to execute computer-executable instructions for operations from a plurality of applications that provide various functionalities to the electronic device 115. For example, the plurality of applications may include programs including an operating system, firmware programs, user operated programs (e.g., a browser, a word processor, a short messaging service (SMS) text program, an email program, etc.), network applications, etc. In another example, the applications may perform a particular operation to synchronize a clock of the electronic device 115. Specifically, the processor 205 may receive a clock signal from a master source that is used to generate a clock tick interrupt that is used to adjust the clock of the electronic device 115 to become synchronized to a master clock of the master electronic device (e.g., the base station 110).

In a further example and according to the exemplary embodiments, the plurality of applications may include a TPS 235 and a tick generator 240. The TPS 235 may be configured to generate the TPWs. As those skilled in the art will understand, the TPS 235 may generate the TPWs using any mechanism. For example, when the network applications are to be used in which a transmission operation is performed, the TPS 235 may generate a schedule of one or more TPWs that repeat. This schedule may also be utilized by another participating electronic device of the transmission operation. In this manner, both the transmitting and receiving electronic devices may utilize a common schedule of TPWs. For example, the TPS 235 may read a configuration file to create the TPWs and may be configured to switch between TPWs when a particular duration for a TPW has passed. It is noted that the exemplary embodiments are described herein where the electronic devices 115, 120, 125 have the same schedule of TPWs. However, the use of a common schedule of TPWs is only exemplary and allows for a clearer representation of the drift issue that is to be resolved by the exemplary embodiments. According to another exemplary embodiment, the electronic devices 115, 120, 125 may utilize different schedules of TPWs. However, the exemplary embodiments may still be utilized in the intended manner to resolve any drift issue. The tick generator 240 may be configured to synchronize the TPWs to other TPWs of at least one of the other electronic devices 120, 125 to which a network application is to be used by utilizing the clock tick interrupt and generating an operating system tick interrupt.

It should be noted that the applications executed by the processor 205 are only exemplary. In a first example, the processor 205 may be an applications processor. In a second example, the processor 205 may be a baseband processor utilized in performing the network applications or operations associated with a network connection with the communications network 105. In a third example, the processor 205 may be a combination of the applications processor and the baseband processor. The functionalities described for the applications may also be represented as a separately incorporated component of the electronic device 115 (e.g., an integrated circuit with or without firmware), or may be a modular component coupled to the electronic device 115. The functionality or functionalities may also be distributed throughout multiple components of the electronic device 115.

The memory 210 may be a hardware component configured to store data related to the functionalities performed by the electronic device 115. For example, the memory 210 may store the schedule of TPWs as generated by the partition application 235 as well as the clock tick interrupt and the operating system tick interrupt. The display device 215 and the I/O device 220 may provide conventional functionalities. Specifically, the display device 215 may be a hardware component configured to provide to a user a visual representation corresponding to the data. The I/O device 220 may be a hardware component configured to receive inputs from the user and output corresponding data.

The transceiver 225 may also provide conventional functionalities. For example, the transceiver 225 may enable a connection or a communication to be established between the electronic device 115 and another electronic device by connecting to the base station 110 and the communications network 105. With the communications network 105 being a PTP enabled network, the electronic device 115 may also be configured to utilize the PTP. Accordingly, the transceiver 225 may be a PTP capable NIC. As noted above, the transceiver 225 is not required to have any particular configuration in utilizing the PTP but is only necessary to be able to use the PTP through any mechanism to synchronize the clock of the electronic device 115.

Figure 3:
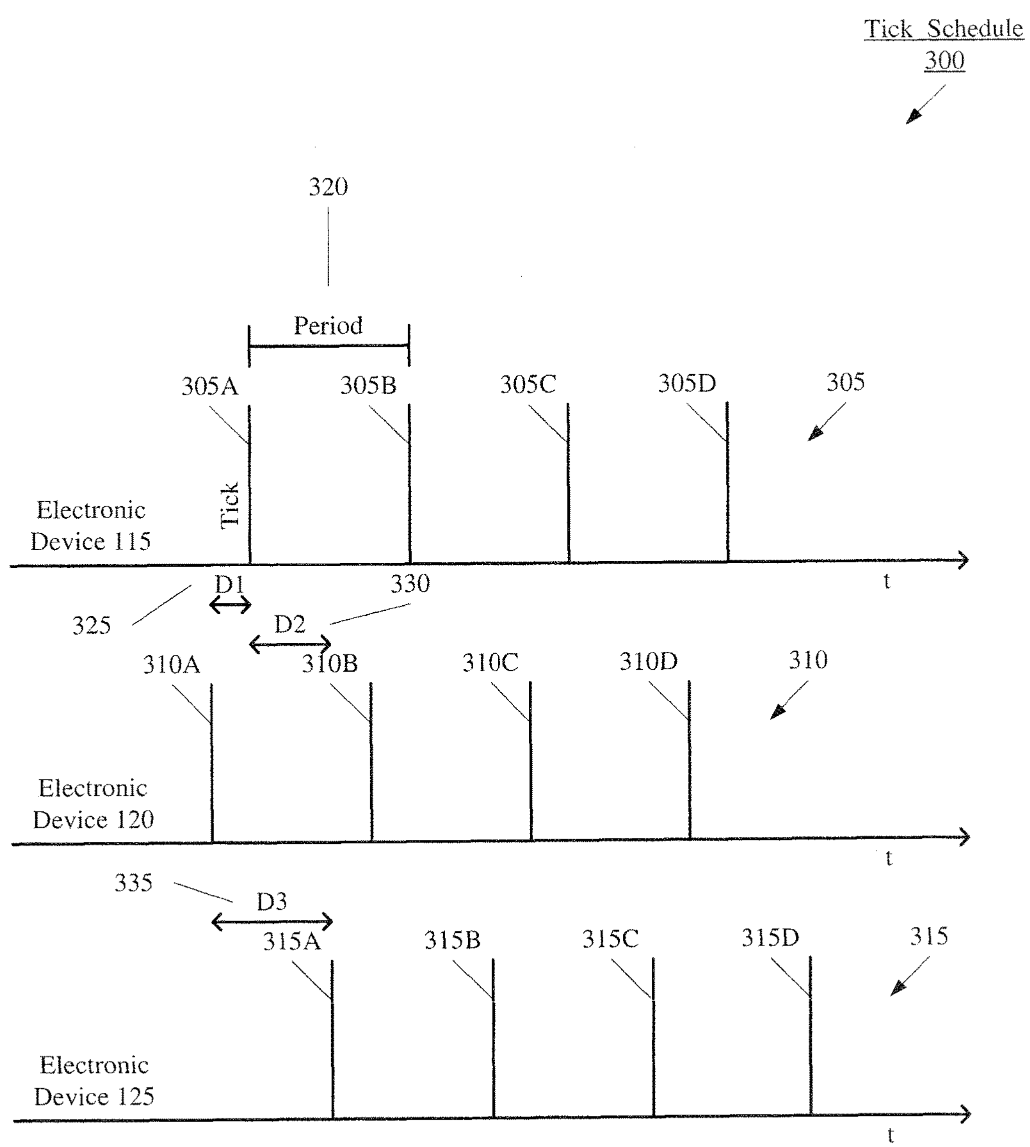
FIG. 3 shows a tick schedule of the electronic devices of the system of FIG. 1.

If the electronic devices 115, 120, 125 of the system 100 were only equipped with the PTP to synchronize corresponding clocks to one another and not equipped with the features of the exemplary embodiments, the operating system ticks of the operating systems of the electronic devices 115, 120, 125 may already be unsynchronized or eventually drift apart from a synchronized state. FIG. 3 shows a tick schedule 300 of the electronic devices 115, 120, 125 of the system 100 of FIG. 1. The tick schedule 300 may illustrate a plurality of ticks or when an interrupt may fire based on when ticks occur. For example, in the electronic device 115, a first plurality of operating system ticks 305 may include operating system ticks 305A-D; in the electronic device 120, a second plurality of operating ticks 310 may include operating system ticks 310A-D; and in the electronic device 125, a third plurality of operating system ticks 315 may include operating system ticks 315A-D. As noted above, a tick may define a time duration or cycle. Accordingly, each of the operating system ticks 305A-D, 310A-D, 315A-D may last for a period 320.

The tick schedule 300 may illustrate a state when the operating system ticks are no longer synchronized. As noted above, the offset between the ticks may continue to drift apart due to hardware inaccuracies in crystal frequency (e.g., an oscillator). Therefore, interrupts that are to be processed at a particular tick and corresponding ticks among the electronic devices 115, 120, 125 may be skewed. For example, the operating system tick 305A may correspond to the operating system tick 310A and the operating system tick 315A; the operating system tick 305B may correspond to the operating system tick 310B and the operating system tick 315B; etc. Accordingly, the particular tick upon which the interrupt may be processed may be, for example, at the operating system tick 305A, the operating system tick 310A, and the operating system tick 315A. However, if synchronized, the operating system ticks and corresponding ticks of the other electronic devices should align over a timeline.

As illustrated, the operating system ticks may have drifted in different ways. For example, from the perspective of the electronic device 115, the operating system tick ticks 310 may have drifted backward relative to the operating system ticks 305 while the operating system ticks 315 may have drifted forward relative to the operating system ticks 305. In another example, from the perspective of the electronic device 120, the operating system ticks 305 may have drifted forward relative to the operating system ticks 310 while the operating system ticks 315 may have drifted even more forward relative to the operating system ticks 310. As a result, the drift of the operating system ticks between the electronic device 115 and the electronic device 120 may result in a time difference D1 325; the drift of the operating system ticks between the electronic device 115 and the electronic device 125 may result in a time difference D2 330; and the drift of the operating system ticks between the electronic device 120 and the electronic device 125 may result in a time difference D3 335. In view of the time differences 325, 330, 335, any resulting TPWs that are created by the partition application 235 which are based on the underlying operating system tick may also not be synchronized. An exemplary scenario of performing a transmission operation based on unsynchronized TPWs will be described below with regard to FIG. 5.

In view of how the operating system ticks across the electronic devices 115, 120, 125 may drift apart from one another, the exemplary embodiments provide a mechanism in which the operating system ticks and the resulting TPWs may remain synchronized with each other as time passes. For illustrative purposes, the following is described from the perspective of the electronic device 115. As noted above, the synchronizing application 240 may be configured to synchronize the TPWs of the electronic device 115 to the other TPWs of the other electronic devices 120, 125. Specifically, the synchronizing application 240 may utilize the clock signal that is received to generate the corresponding clock tick interrupt that synchronizes the clock of the electronic device 115 to the other clocks of the other electronic devices 120, 125. Accordingly, upon receiving the clock signal of the PTP, the clock of the electronic device 115 may be synchronized using any mechanism associated with this operation of the PTP.

The tick generator 240 may also receive the clock signal to generate the clock tick interrupt to further generate an operating system tick interrupt. As noted above, the clock tick and the operating system tick in which interrupts may be processed may be two separate and independent ticks. Thus, the clock tick interrupt may be used to synchronize the clock but has no further functionality or relevance to the operating system. However, the exemplary embodiments provide a mechanism in which the clock tick interrupt is used to synchronize converted to the operating system tick interrupt to further synchronize the operating system ticks and the TPWs of the electronic device 115 to the other ticks and TPWs of the other electronic devices 120, 125.

Figure 4:
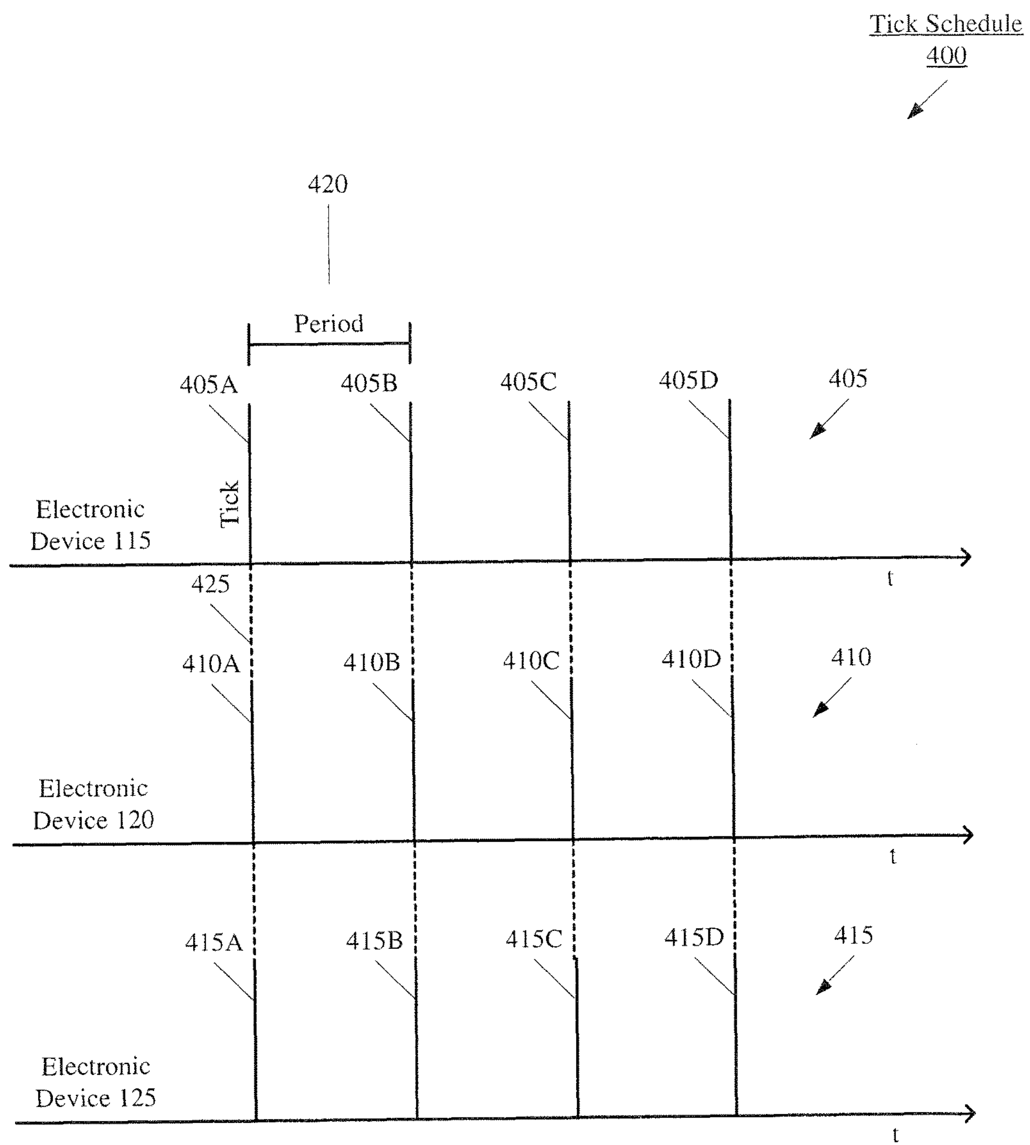
FIG. 4 shows a tick schedule of the electronic devices of the system of FIG. 1 according to the exemplary embodiments.

If the electronic devices 115, 120, 125 of the system 100 were equipped with the PTP to synchronize corresponding clocks to one another and equipped with the features of the exemplary embodiments, the operating system ticks of the operating systems of the electronic devices 115, 120, 125 may already become synchronized. FIG. 4 shows a tick schedule 400 of the electronic devices 115, 120, 125 of the system 100 of FIG. 1. In a substantially similar manner as the tick schedule 300, the tick schedule 400 may illustrate a plurality of ticks or when an interrupt may fire based on when ticks occur. For example, in the electronic device 115, a first plurality of operating system ticks 405 may include operating system ticks 405A-D; in the electronic device 120, a second plurality of operating ticks 410 may include operating system ticks 410A-D; and in the electronic device 125, a third plurality of operating system ticks 415 may include operating system ticks 415A-D. Each of the operating system ticks 405A-D, 410A-D, 415A-D may last for a period 420.

The tick schedule 400 may illustrate a state when the operating system ticks have become synchronized. Once synchronized, interrupts that are to be processed at a particular tick and corresponding ticks among the electronic devices 115, 120, 125 may be aligned. For example, the operating system tick 405A may correspond to the operating system tick 410A and the operating system tick 415A. Accordingly, an alignment 425 may be achieved between the operating system ticks 405A, 410A, 415A. Further alignments 425 may be achieved for the operating system ticks 405B, 410B, 415B, etc. In view of the alignment 425, any resulting TPWs that are created by the partition application 235 which are based on the underlying operating system tick may also be synchronized. An exemplary scenario of performing a transmission operation based on synchronized TPWs will be described below with regard to FIG. 6.

Figure 5:
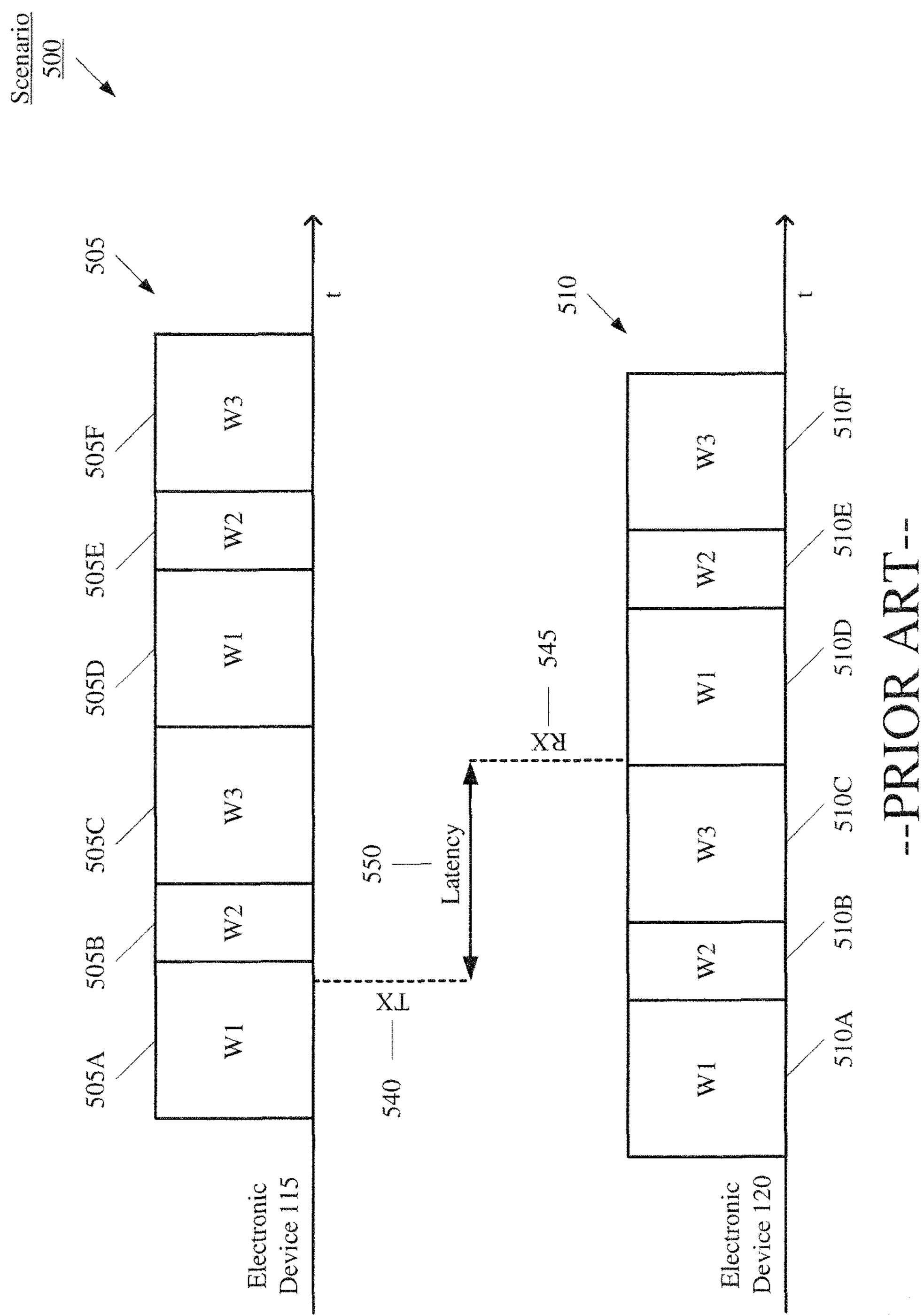
FIG. 5 shows a scenario of a data transmission.

FIG. 5 shows a scenario 500 of performing a data transmission. Specifically, the scenario 500 may relate to a network application of the electronic device 115 being used to transmit data to the electronic device 120. Thus, a network application of the electronic device 120 may be used to receive the data from the electronic device 115 (e.g., over the communications network 105). The scenario 500 may also relate to when the features of the exemplary embodiments are not incorporated and only the clocks between the electronic devices 115, 120 are synchronized by the clock signal used to generate the clock tick interrupt of the PTP. The scenario 500 may further relate to the drift that occurs in a substantially similar manner as the tick schedule 300 of FIG. 3. Specifically, the operating system ticks 310 of the electronic device 120 may have drifted backward relative to the operating system ticks 305 of the electronic device 115.

As illustrated, the partition application 235 of the electronic device 115 may have created a plurality of TPWs 505. Specifically, the TPWs 505 may be created as an ordered set that is repeated. For example and as illustrated, the TPWs 505 may include three ordered windows W1, W2, and W3. Accordingly, the schedule of the TPWs 505 may include TPW 505A (corresponding to W1), TPW 505B (corresponding to W2), TPW 505C (corresponding to W3), TPW 505D (corresponding to W1), TPW 505E (corresponding to W2), and TPW 505F (corresponding to W3). The three ordered windows W1, W2, and W3 may continue beyond the TPW 505F. A substantially similar operation may be utilized by the partition application 235 of the electronic device 115. Accordingly, TPWs 510 may also include the three ordered windows W1, W2, and W3 where the schedule of the TPWs 510 may include TPW 510A (corresponding to W1), TPW 510B (corresponding to W2), TPW 510C (corresponding to W3), TPW 510D (corresponding to W1), TPW 510E (corresponding to W2), and TPW 510F (corresponding to W3). Furthermore, assuming identical schedules, the TPW 505A may correspond to the TPW 510A; the TPW 505B may correspond to the TPW 510B; etc.

In an exemplary implementation, the W1 may have a duration of four ticks, the W2 may have a duration of two ticks, and the W3 may have a duration of four ticks. Furthermore, the window W1 may be the only TPW in which transmissions may be performed. For example, W1 may be reserved for networking stack processes; W2 may be reserved for a second process, and W3 may be reserved for a third process. Thus, the electronic device transmitting the data must perform the transmission during any TPW that corresponds to W1 (e.g., TPW 505A or TPW 505D). The electronic device receiving the data must also perform the transmission during any TPW that corresponds to W1 (e.g., TPW 510A or TPW 510D). However, it is clear from the scenario 500 that when a drift has occurred such that the underlying ticks are skew and the resulting TPWs are unsynchronized, the time and latency in performing the transmission may increase. Specifically, the electronic device 115 may perform a transmission 540 within the TPW 505A which corresponds to W1. However, at the time that the transmission 540 reaches the electronic device 120, the schedule of the TPWs 510 is already at the TPW 510B corresponding to W2. Therefore, to complete the transmission operation, the electronic device 120 must wait until the next TPW corresponding to W1 is reached (e.g., TPW 510D) such that the reception 545 is completed. For example, if the transmission 540 were to occur at three ticks into the TPW 505A and the reception were to occur at one tick into the TPW 610B, the receiving electronic device 120 must wait five ticks (e.g., the remaining ticks of TPW 610B and all the ticks of TPW 610C) until the TPW 610D is reached. This delay may create a latency 550 which is greater than necessary than if the TPWs 505, 510 had been synchronized.

Figure 6:
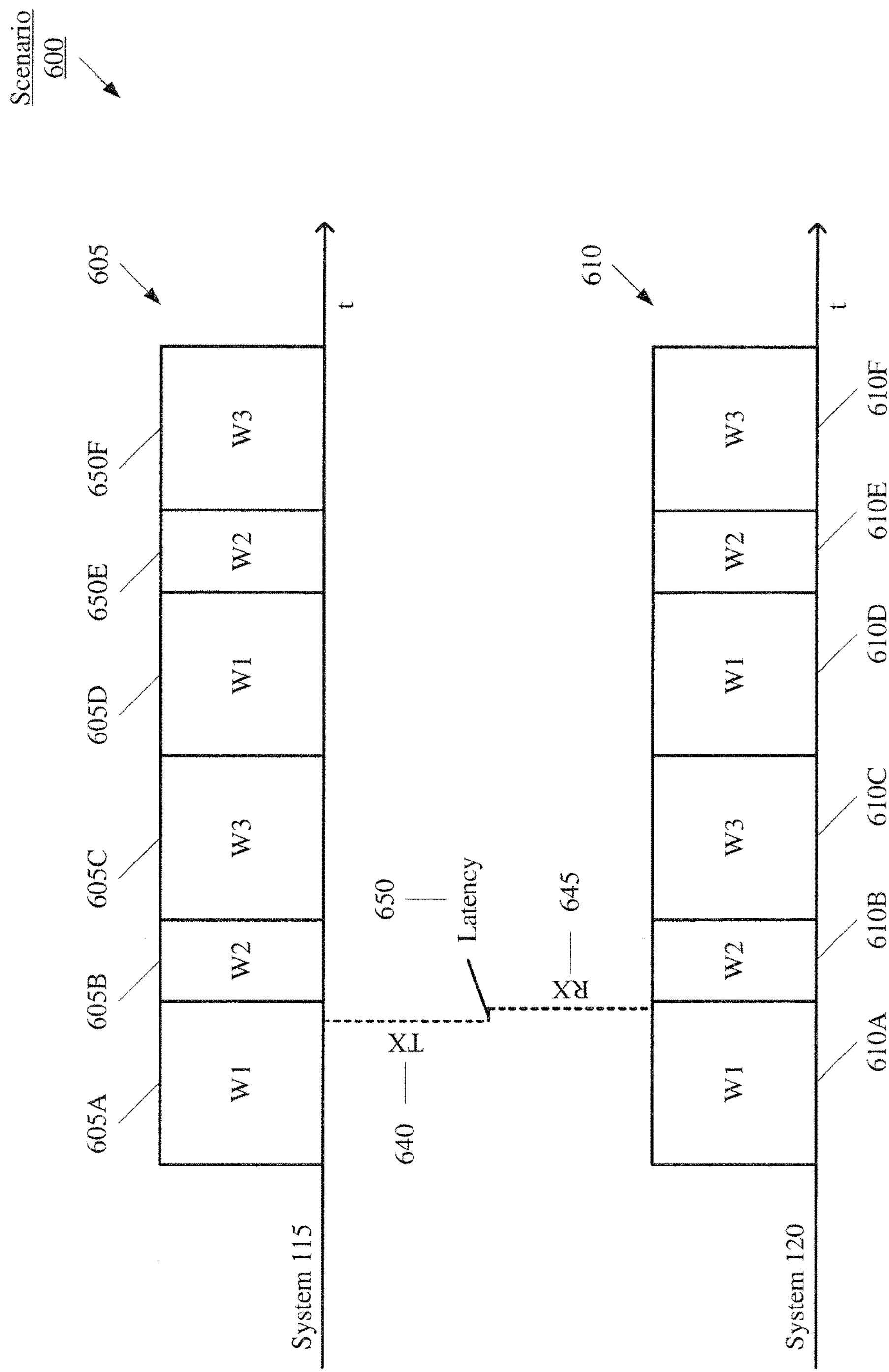
FIG. 6 shows a scenario of a data transmission according to the exemplary embodiments.

FIG. 6 shows a scenario 600 of a data transmission according to the exemplary embodiments. Specifically, the scenario 600 may be how the scenario 500 would have been performed had the feature of the exemplary embodiments been implemented in which the clock tick interrupt was used to synchronize the clocks of the electronic devices 115, 120 as well as to create an operating system tick interrupt to synchronize the TPWs of the electronic devices 115, 120. Accordingly, the same schedules of ordered windows W1, W2, and W3 may be used. Furthermore, the TPWs 505A-F may correspond to TPWs 605A-F, respectively, and the TPWs 510A-F may correspond to the TPWs 610A-F. in contrast to the scenario 500, no drift has occurred or any drift has been compensated in a substantially similar manner as the tick schedule 400 of FIG. 4 such that the operating system ticks 410 of the electronic device 120 may are aligned with the operating system ticks 305 of the electronic device 115.

Again, the window W1 may be the only TPW in which transmissions may be performed. Thus, the electronic device transmitting the data must perform the transmission during any TPW that corresponds to W1 (e.g., TPW 605A or TPW 605D). The electronic device receiving the data must also perform the transmission during any TPW that corresponds to W1 (e.g., TPW 610A or TPW 610D). Under the scenario 600 in which the TPWs 605, 610 are aligned and synchronized, the time and latency in performing the transmission may be minimized. Specifically, the electronic device 115 may perform a transmission 640 within the TPW 605A which corresponds to W1. At the time that the transmission 640 reaches the electronic device 120, the schedule of the TPWs 610 is also at the TPW 510A corresponding to W1. Therefore, the electronic device 120 may complete the transmission within the same duration of time of the TPW 605A, 610A, possibly even within the same tick. Any naturally occurring delay may be the only latency 650 that is created. That is, the latency 650 may be a time that is always present for any transmission to occur. However, no additional time is added to the latency 650, particularly due to a shift in the TPWs where the receiving electronic device must wait for an allowed window for the transmission operation to be performed.

Figure 7:
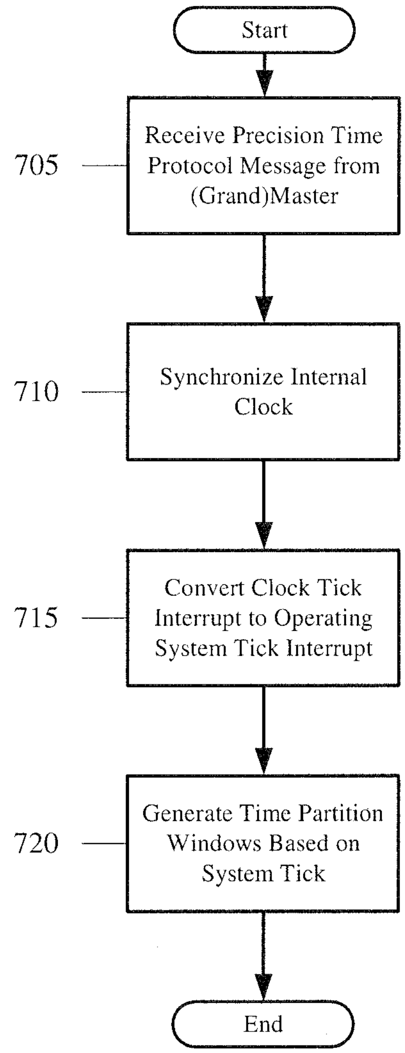
FIG. 7 shows a method for generating time partition windows based on an operating system tick according to the exemplary embodiments.

FIG. 7 shows a method 700 for generating TPWs based on an operating system tick according to the exemplary embodiments. The method 700 may relate to maintaining an alignment or compensating for drift between schedules of TPWs of respective electronic devices. Specifically, through an interrupt used for clock synchronization, another interrupt may be created that is used for TPW synchronization. The method 700 will be described from the perspective of the electronic device 115 of FIGS. 1 and 2. However, it is again noted that the method 700 may also be used with the other electronic devices 120, 125, particularly when one of these other electronic devices 120, 125 is performing a data transmission with the electronic device 115.

Initially, it may be assumed that the electronic device 115 is connected to the communications network 105 that is a TSN utilizing the PTP. It may also be assumed that the transceiver 225 is a PTP capable NIC. Thus, in 705, the electronic device 115 receives a PTP message from the master electronic device such as the base station 110. The PTP message may be a clock signal which is used to generate a clock tick interrupt that is configured to synchronize the clock ticks of the clock of the electronic device 115 with the clock ticks of the master clock of the base station 110. Accordingly, in 710, the electronic device 115 may synchronize its clock using the clock tick interrupt.

According to the exemplary embodiments, in 715, the electronic device 115 may also utilize the clock tick interrupt for further operations. Specifically, the clock tick interrupt used for the PTP may be converted to an operating system tick interrupt. The operating system tick interrupt may be used to synchronize the operating system ticks of the electronic device 115 with the operating system ticks of the base station 110. Accordingly, in 720, the electronic device 115 may generate (or shift) the TPWs based on the operating system tick.

By using the exemplary embodiments and with another participating electronic device also using the exemplary embodiments, the schedules of TPWs of both electronic devices may be aligned as the underlying ticks have been synchronized. Thus, if a data transmission were to be performed, the knowledge of the schedules of TPWs as well as where exactly the electronic devices are within the schedule (e.g., which TPW) at any given moment in time, the data transmission may be performed in a deterministic manner as statements about timing of the TPWs may be made deterministically.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:

at a first electronic device:

receiving a clock signal from a second electronic device, the clock signal indicating a first modification to a first clock tick of a first clock of the first electronic device to synchronize the first clock to a second clock of the second electronic device, the clock tick defining a clock time period that tracks a first passage of time on the first clock;

generating an operating system tick interrupt based on the clock signal, the operating system tick interrupt indicating a second modification to a first operating system tick of a first processor of the first electronic device to synchronize the first operating system tick of the first electronic device to a second operating system tick of the second electronic device, the first operating system tick defining an operating system time period that tracks a second passage of time on the processor; and generating a first schedule of first time partition windows based on the first operating system tick, the first time partition windows respectively defining select operations allowed to be performed therein, wherein the first schedule of the first time partition windows is synchronized to a second schedule of second time partition windows of the second electronic device.

2. The method of claim 1, wherein each of the time partition windows includes at least one first operating system tick.

3. The method of claim 1, wherein the first schedule of the first time partition windows includes a plurality of window types in an ordered set.

4. The method of claim 3, wherein the ordered set of window types repeats.

5. The method of claim 3, wherein a first one of the window types is for a transmission exchange operation.

6. The method of claim 5, further comprising:

transmitting data to a third electronic device during a moment when the first electronic device is in the schedule at a select one of the first time partition windows that is the first window type.

7. The method of claim 6, wherein the third electronic device has a third schedule of third time partition windows based on a third operating system tick that is synchronized to the second operating system tick of the second electronic device, and wherein the third schedule of the third time partition windows is synchronized to the second schedule of the second time partition windows of the second electronic device.

8. The method of claim 1, further comprising:

synchronizing the first clock to the second clock based on the clock signal.

9. The method of claim 1, wherein the second modification is a shift of the first operating system tick one of forwards or backwards in time where each of the first operating system ticks are aligned with corresponds ones of the second operating system ticks.

10. The method of claim 1, wherein the first electronic device is an edge device and the second electronic device is a base station of a communications network to which the first electronic device has established a connection.

11. An electronic device, comprising:

a transceiver configured to receive a clock signal from a second electronic device, the clock signal indicating a first modification to a first clock tick of a first clock of the electronic device to synchronize the first clock to a second clock of the second electronic device, the first clock tick defining a clock time period that tracks a first passage of time on the first clock; and a processor generating an operating system tick interrupt based on the clock signal, the operating system tick interrupt indicating a second modification to a first operating system tick of a first processor of the electronic device to synchronize the first operating system tick of the electronic device to a second operating system tick of the second electronic device, the first operating system tick defining an operating system time period that tracks a second passage of time on the processor, the processor including a time partition scheduler generating a first schedule of first time partition windows based on the first operating system tick, the first time partition windows respectively defining select operations allowed to be performed therein, wherein the first schedule of the first time partition windows is synchronized to a second schedule of second time partition windows of the second electronic device.

12. The electronic device of claim 11, wherein each of the time partition windows includes at least one first operating system tick.

13. The electronic device of claim 11, wherein the first schedule of the first time partition windows includes a plurality of window types in an ordered set.

14. The electronic device of claim 13, wherein the ordered set of window types repeats.

15. The electronic device of claim 13, wherein a first one of the window types is for a transmission exchange operation.

16. The electronic device of claim 15, wherein the transceiver further transmits data to a third electronic device during a moment when the electronic device is in the schedule at a select one of the first time partition windows that is the first window type.

17. The electronic device of claim 16, wherein the third electronic device has a third schedule of third time partition windows based on a third operating system tick that is synchronized to the second operating system tick of the second electronic device, and wherein the third schedule of the third time partition windows is synchronized to the second schedule of the second time partition windows of the second electronic device.

18. The electronic device of claim 11, wherein the processor synchronizes the first clock to the second clock based on the clock signal.

19. The electronic device of claim 11, wherein the second modification is a shift of the first operating system tick one of forwards or backwards in time where each of the first operating system ticks are aligned with corresponds ones of the second operating system ticks.

20. A system, comprising:

a first electronic device receiving a clock signal that indicates a first modification to a first clock tick of a first clock of the first electronic device, the first clock tick defining a clock time period that tracks a first passage of time on the first clock; and a second electronic device receiving the clock signal that indicates a second modification to a second clock tick of a second clock of the second electronic device, the second clock tick defining the clock time period that tracks a second passage of time on the second clock, wherein the first and second electronic devices generate first and second operating system tick interrupts, respectively, based on the clock signal, the first and second operating system tick interrupts indicating a third modification and a fourth modification, respectively, to a first operating system tick of a first processor of the first electronic device and a second operating system tick of a second processor of the second electronic device, respectively, wherein the first and second operating system tick interrupts synchronize the first operating system tick of the first electronic device to the second operating system tick of the second electronic device, the first and second operating system ticks each defining an operating system time period that tracks a second passage and a third passage of time on the first and second processors, respectively, wherein the first and second processors each generate a first schedule of first time partition windows based on the first operating system tick and a second schedule of second time partition windows based on the second operating system tick, the first schedule of the first time partition windows being synchronized to the second schedule of the second time partition windows.

* * * * *